United States Patent
Ishitani et al.

(10) Patent No.: US 7,987,184 B2
(45) Date of Patent: Jul. 26, 2011

(54) INFORMATION RETRIEVAL APPARATUS AND METHOD

(75) Inventors: Yasuto Ishitani, Kawasaki (JP); Masaru Suzuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 515 days.

(21) Appl. No.: 11/857,065

(22) Filed: Sep. 18, 2007

(65) Prior Publication Data

US 2009/0112836 A1 Apr. 30, 2009

(30) Foreign Application Priority Data

Mar. 28, 2007 (JP) ................. 2007-085707

(51) Int. Cl.
*G06F 7/00* (2006.01)
*G06F 17/30* (2006.01)
(52) U.S. Cl. ...................... 707/727; 707/751
(58) Field of Classification Search .................. None
See application file for complete search history.

(56) References Cited

U.S. PATENT DOCUMENTS
2007/0061295 A1 3/2007 Burke et al. .................. 707/3

FOREIGN PATENT DOCUMENTS
JP 2006-65754 9/2006
WO WO 03/042865 A2 5/2003

OTHER PUBLICATIONS

U.S. Appl. No. 11/849,823, filed Sep. 4, 2007, Suzuki, et al.
Search Report from corresponding EP 07018261.3 dated Jun. 3, 2009.
Agichtein, et al., "*Improving Web Search Ranking by Incorporating User Behavior Information*", Proceedings of the 29th Annual International ACM Sigir Conference on Research and Development in Information Retrieval, 2006, pp. 19-26.
Su, et al., "*WhatNext: A Prediction System for Web Requests Using N-gram Sequence Models*", Web Information Systems Engineering, 2000, Proceedings of the First International Conference on Hong Kong, China; Jun. 19-21, 2000, vol. 1, pp. 214-221.
Cavnar, et al., "*N-Gram-Based Text Categorization*", Proceedings Annual Symposium on Document Analysis & Information Retrieval, Jan. 1, 1998, pp. 1-14.

*Primary Examiner* — Kavita Padmanabhan
(74) *Attorney, Agent, or Firm* — Ohlandt, Greeley, Ruggiero & Perle, L.L.P.

(57) ABSTRACT

An information retrieval apparatus includes a display unit which displays a first display menu showing a plurality of estimated meaning items and a second display menu showing a plurality of retrieval target items corresponding to the meaning items selected on the first display menu. A log storage unit stores a selection log on the first and second display menus. An estimation unit estimates a retrieval target item selection tendency from the selection log. A ranking unit ranks the plurality of retrieval target items on the basis of the selection tendency. The display unit displays a plurality of retrieval target items on the second display menu upon arranging them in accordance with ranking.

18 Claims, 4 Drawing Sheets

US 7,987,184 B2

INFORMATION RETRIEVAL APPARATUS AND METHOD

CROSS-REFERENCE TO RELATED APPLICATIONS

This application is based upon and claims the benefit of priority from prior Japanese Patent Application No. 2007-085707, filed Mar. 28, 2007, the entire contents of which are incorporated herein by reference.

BACKGROUND OF THE INVENTION

1. Field of the Invention

The present invention relates to an information retrieval apparatus and method.

2. Description of the Related Art

In order to present information to a user and process an action by the user with respect to the presented information, a technique called a graphical user interface (GUI) is used. A general GUI is designed such that when the user indicates an object on a window by operating a pointing device (indicating device) such as a mouse, a menu window showing a list of actions with respect the object can be displayed. When the user selects a desired item on this menu window, an action corresponding to this item is executed. A technique called a context menu in a GUI, in particular, can display a menu while limiting selectable operations in accordance with the format of target data. This allows the user to easily indicate an action.

Various techniques associated with GUIs have been proposed. For example, there is available a technique of estimating the intention of a user from the meaning of a keyword which the user has marked in a browed document and presenting a menu of items selected from a plurality of candidates in accordance with the intention of the user (see, for example, JP-A 2006-65754 (KOKAI)). According to the technique disclosed in this publication, the order of items to be presented in a menu is determined in advance.

Assume that there are many items to be presented. In this case, if an item which the user frequently selects is displayed at an unspecified low-order position in a menu, it takes time for the user to search out the desired item, resulting in complex operation. The complexity of such operation is noticeable especially when the user is to select an item from a plurality of linked menus.

BRIEF SUMMARY OF THE INVENTION

The present invention has been made to solve the above problem in an information retrieval apparatus which performs information retrieval in accordance with a designated keyword and a selected item on a menu, and has as its object to provide an information retrieval apparatus, information retrieval method, and information retrieval program which are designed to improve the operability of such information retrieval.

According to an aspect of the present invention, there is provided an information retrieval apparatus which includes a display unit which displays a first display menu showing a plurality of estimated meaning items and a second display menu showing a plurality of retrieval target items corresponding to the meaning items selected on the first display menu. A log storage unit stores a selection log on the first and second display menus. An estimation unit estimates a retrieval target item selection tendency from the selection log. A ranking unit ranks the plurality of retrieval target items on the basis of the selection tendency. The display unit displays a plurality of retrieval target items on the second display menu upon arranging them in accordance with ranking.

DETAILED DESCRIPTION OF THE INVENTION

Figure 1:
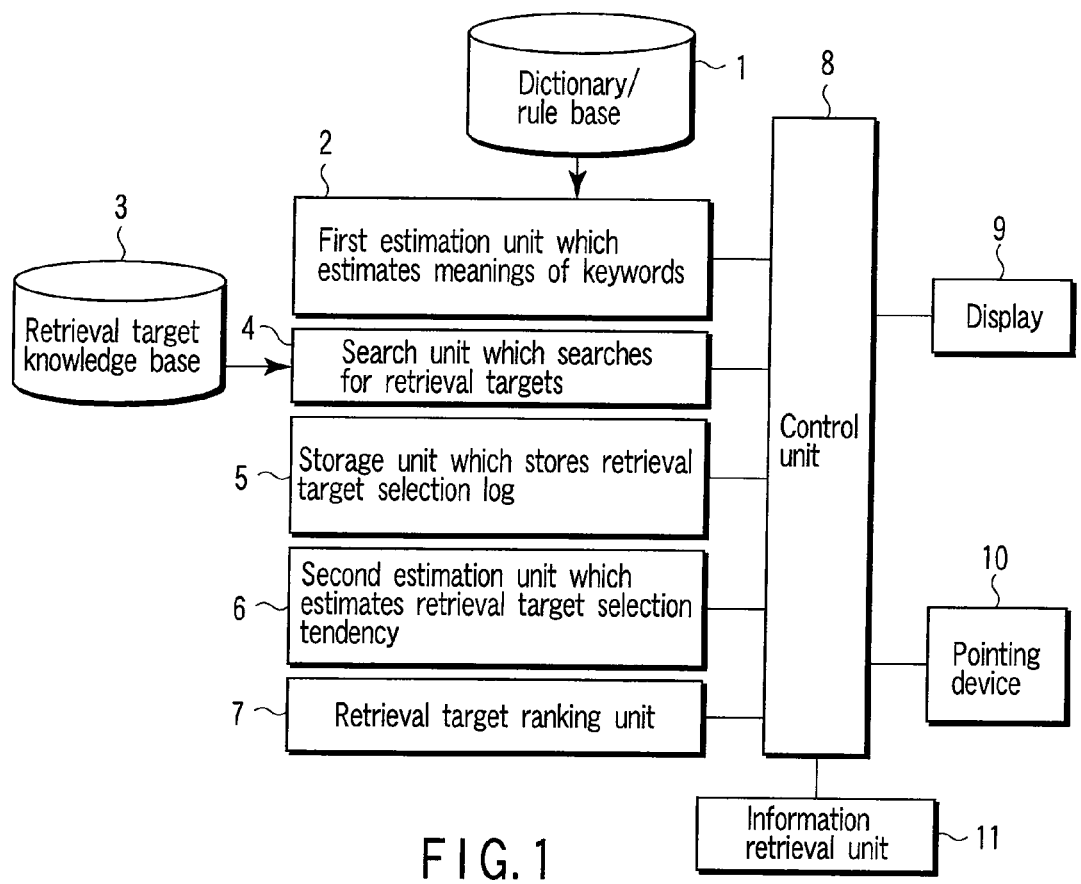
FIG. 1 is a block diagram of an information retrieval system according to an embodiment.

As shown in FIG. 1, an information retrieval system comprises a dictionary/rule base 1, a first estimation unit (meaning estimation unit) 2 which estimates the meaning of a keyword, a retrieval target knowledge base 3, a search unit 4 which searches for a retrieval target, a storage unit 5 which stores a retrieval target selection log, a second estimation unit 6 which estimates a selection tendency toward a retrieval target, a ranking unit 7 for retrieval targets, a control unit 8, a display 9, a pointing device 10, and an information retrieval unit 11.

The dictionary/rule base 1 is used when the meaning estimation unit 2 estimates the meaning of a keyword, and is a database storing a plurality of keywords and a plurality of meaning items (to be simply referred to as "meanings" hereinafter) which the plurality of keywords have in association with each other.

Figure 2:
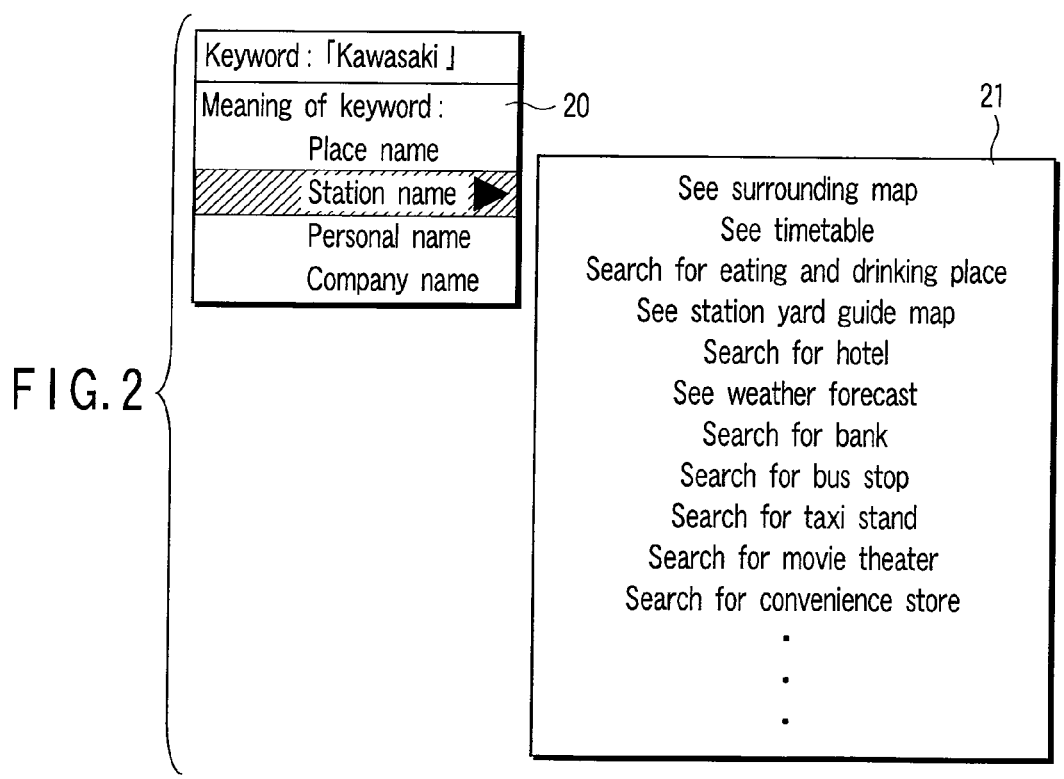
FIG. 2 is a view showing an example of a context menu of meanings and a context menu of retrieval targets.

The meaning estimation unit 2 estimates a plurality of meanings of a keyword designated or selected by the user by searching the dictionary/rule base 1 with the keyword. The estimation result obtained by the meaning estimation unit 2 is expressed as a menu and is presented to the user through the display 9 under the control of the control unit 8. Referring to FIG. 2, when the user selects the keyword "kawasaki" in a document displayed on the display 9 with the pointing device 10, the meaning estimation unit 2 estimates that the meaning of the keyword "kawasaki" is "place name", "personal name", "station name", or "company name", and presents an estimation result 20 to the user.

The retrieval target knowledge base 3 is a database storing a plurality of meanings and a plurality of retrieval target items (to be simply referred to as "retrieval targets" hereinafter) corresponding to the respective meanings. More specifically, this database is a knowledge database storing combinations of the meanings of keywords, retrieval targets, and additional keywords.

The retrieval target search unit 4 searches the retrieval target knowledge base 3 constructed in advance for retrieval targets associated with the meaning of a keyword which the user has selected from a meaning estimation result. The retrieval target search result is expressed as a menu and presented to the user through the display 9 under the control of the control unit 8.

FIG. 2 shows an example in which when the user selects "station name" upon regarding that "station name" is appropriate as the meaning of the keyword "kawasaki", that is, the meaning of the keyword is "station name", the system determines that there are retrieval targets like "see surrounding map", "see timetable", "search for eating and drinking place", "see station yard guide map", "search for hotel", "see weather forecast", "search for bank", "search for bus stop", "search for taxi stand", "search for movie theater", and "search for convenience store", and presents them to the user.

The control unit 8 is a main part which controls interaction between the system and the user, and is, for example, a CPU. The display 9 displays a document, the context menu of the meanings of a keyword which the user has selected by using the pointing device 10, and the context menu of retrieval targets corresponding to the keyword.

The pointing device 10 is equivalent to an indicating means which, for example, the user manually operates to select a keyword in a browsed document, an appropriate meaning from the context menu of the meanings of a keyword presented by the system, or an appropriate retrieval target from the context menu of retrieval targets corresponding to the keyword presented by the system.

The information retrieval unit 11 issues an information retrieval request to an existing retrieval engine or retrieval service on the basis of the retrieval target which the user has selected from a retrieval target search result, and obtains a retrieval result. In the case shown in FIG. 2, when the user selects "search for hotel" as a retrieval target 21, the information retrieval unit 11 adds the keyword "hotel" to the keyword "kawasaki" and outputs a retrieval request to the existing retrieval engine. The information retrieval unit 11 receives the retrieval result obtained by the retrieval engine. The control unit 8 presents the retrieval result to the user through the display 9.

The retrieval target selection log storage unit 5 stores the log of retrieval targets selected by the user. More specifically, the storage unit 5 stores a selection log containing the meanings selected on the context menus of the meanings of keywords and the retrieval targets selected on the context menus of retrieval targets corresponding to the keywords.

The retrieval target selection tendency estimation unit 6 counts the frequency of a retrieval target which the user has selected, for each meaning of a keyword, from the context menu of retrieval targets, and estimates the retrieval target selection tendency of the user for each meaning of the keyword.

The retrieval target ranking unit 7 ranks (orders) retrieval targets for the respective meanings of a keyword on the basis of the result obtained by the retrieval target selection tendency estimation unit 6. The control unit 8 expresses the ranking result as a retrieval target context menu and presents it to the user through the display 9.

An outline of the interaction between the system and the user will be described with reference to FIG. 3.

[Outline 1 of Interaction]

Step 1: The user selects a keyword in a document browsed on the display 9 ("(1)" in FIG. 3).

Step 2: The control unit 8 sends the keyword selected by the user to the meaning estimation unit 2 ("(2)" in FIG. 3). The control unit 8 then receives the list of the meanings of the keyword estimated by the meaning estimation unit 2, expresses the list of meanings as a menu, and presents it to the user through the display 9 ("(3)" in FIG. 3).

Step 3: The user selects an appropriate meaning in terms of information retrieval from the menu of the meanings of the keyword displayed on the display 9.

Step 4: The control unit 8 sends the meaning of the keyword selected by the user to the retrieval target search unit 4.

Figure 3:
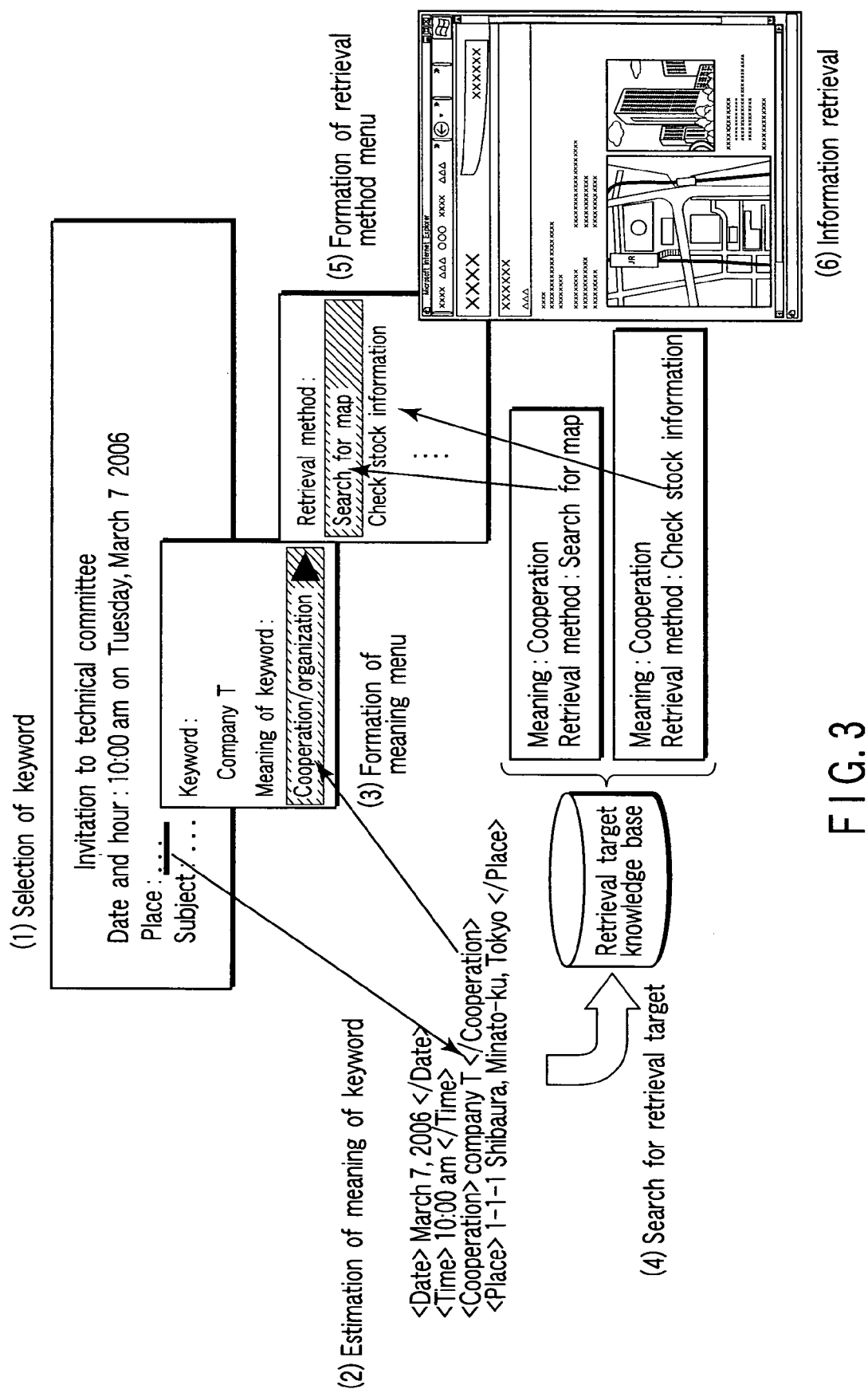
FIG. 3 is a view showing an outline of the interaction between a system and a user.

The control unit 8 then receives the list of the retrieval targets searched out by the retrieval target search unit 4 ("(4)" in FIG. 3). The control unit 8 also expresses the list of the retrieval targets as a menu and presents it to the user through the display 9 ("(5)" in FIG. 3).

Step 5: The user selects an appropriate retrieval target on the retrieval target menu displayed on the display 9.

Step 6: The control unit 8 sends the retrieval target selected by the user to the information retrieval unit 11. The control unit 8 presents the retrieval result obtained by the information retrieval unit 11 to the user through the display 9 ("(6)" in FIG. 3).

An example of the interaction shown in FIG. 3 will be described from the viewpoint of user operation. Assume that the user is seeing a committee invitation on a Web browser or a mailer. Assume also that the user wants to know a map to the site of the committee and has selected a company T in the text (step 1 described above). The information retrieval system of this embodiment determines the meaning of the keyword selected by the user as "cooperation", expresses "cooperation/organization" as a menu, and presents it to the user (step 2 described above). The user selects the presented meaning (step 3 described above). The system then searches the retrieval target knowledge base 3 on the basis of the meaning "cooperation/organization" of the keyword selected by the user, lists up the retrieval targets, expresses the list of the retrieval targets as a menu, and presents it to the user (step 4 described above). Since the user wants to know a map to the company T, he/she selects the retrieval target "search for map" from the menu presented in this manner (step 5 described above). The system outputs a retrieval request to the information retrieval engine upon adding the additional keyword "map" to the keyword "company T" selected by the user on the basis of retrieval target knowledge corresponding to the retrieval target selected by the user, and receives a retrieval result from the retrieval engine (step 6 described above).

The information retrieval system of this embodiment comprises a function of ranking retrieval targets in addition to a mechanism for performing information retrieval while narrowing down retrieval targets through a plurality of linked menus.

The following are the interaction between the user and the system and operation in the system.

[Outline 2 of Interaction]

Step 1: The user selects a keyword in a document browsed on the display 9.

Step 2: The control unit 8 sends the keyword selected by the user to the meaning estimation unit 2, receives the list of the meanings of the keyword estimated by the meaning estimation unit 2, expresses the list of the meaning as a menu, and presents it to the user through the display 9.

Step 3: The user selects an appropriate meaning in terms of retrieval from the meanings of the keyword displayed on the display 9.

Step 4': The control unit 8 sends first the meaning of the keyword selected by the user to the retrieval target search unit 4. The control unit 8 then sends the retrieval targets searched out by the retrieval target search unit 4 to the ranking unit 7, and receives the retrieval target ranking result from the retrieval target ranking unit 7. The control unit 8 expresses the retrieval target ranking result as a menu and presents it to the user through the display 9.

Step 5': The user selects an appropriate retrieval target for the user from the retrieval targets displayed on the display 9. At this time, the system stores "meaning of keyword" and "retrieval target corresponding to meaning of keyword", which are selected by the user, as log information in the retrieval target selection log storage unit 5.

Step 6: The control unit 8 sends the retrieval target selected by the user to the information retrieval unit 11, and presents the retrieval result output from the information retrieval unit 11 to the user.

Obviously, from the above description, step 4' corresponding to step 4 and step 5' corresponding to step 5 in the interaction in outline 2 differ from step 4 and step 5 in the interaction in outline 1.

This system is configured such that the retrieval target selection tendency estimation unit 6 calculates the statistical tendencies of user's meaning selection and retrieval target selection on the basis of the information stored in the retrieval target selection log storage unit 5 at a predetermined timing determined by the system by itself, a predetermined timing set by the user, or the timing desired by the user.

The operations of the retrieval target selection log storage unit 5, retrieval target selection tendency estimation unit 6, and retrieval target ranking unit 7 will be described below.

(Operation of Retrieval Target Selection Log Storage Unit 5)

Figure 5:
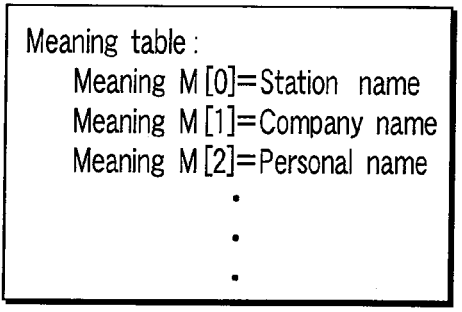
FIG. 5 is a view showing a concrete example of a log table.
Figure 5:
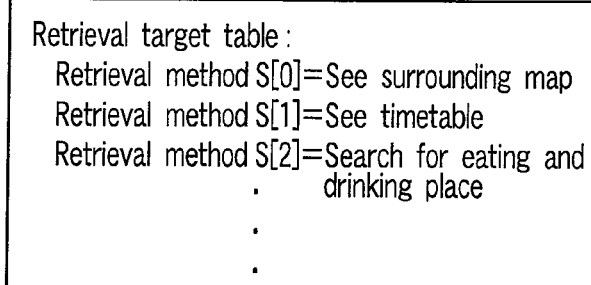

The retrieval target selection log storage unit 5 continuously stores the retrieval target selection log of a user from the time point when the user uses this information retrieval system first. Assume that each log data is expressed as a combination of (m, s, t) and is time-serially stored on the basis of the times of selection. Assume that when a selection event occurs, the storage unit 5 stores (m, s, t) in a log table H. In this case, m represents the meaning type of a keyword, s represents a retrieval target type, t represents the time, and H[k] (k=1, 2, . . . ) represents a log table. FIG. 5 shows a concrete example of the log table.

(Operation of Retrieval Target Selection Tendency Estimation Unit 6)

Assume that the retrieval target selection tendency estimation unit 6 has estimated the following three types of retrieval target selection tendencies of a user.

Short-Term Selection Tendency Toward Single Retrieval Target

The unit 6 acquires retrieval target selection frequency mi-C1-sj for each meaning within 24 hr from the time when the user has selected a keyword, and sorts retrieval targets in descending order of frequencies for each meaning. Let mi (i=1, 2, . . . , NM) be the ith meaning type, sj (j=1, 2, . . . , NS) be the jth retrieval target type, mi-C1-sj be a short-term frequency toward the retrieval target sj corresponding to the meaning mi, NM be the total number of meanings, and NS be the total number of retrieval targets. The following is a procedure of obtaining a short-term selection tendency toward a single retrieval target.

Procedure of Obtaining Short-Term Selection Tendency Toward Single Retrieval Target Step (a-1): A short-term retrieval target frequency table C1[NM] [NS] and a short-term meaning frequency table CM1[NM] are prepared.

Step (a-2): The system initializes the short-term retrieval target frequency table C1[NM] [NS] and the short-term meaning frequency table CM1[NM].

Step (a-3): The system assigns numbers to the meanings of the respective keywords to prepare a meaning table M[NM] which represents the correspondence between the meanings and the numbers. In this case, a meaning m is input to M[i].

Step (a-4): The system assigns numbers to the respective retrieval targets to prepare a retrieval target table S[NS] representing the correspondence between the retrieval targets and the numbers. In this case, a retrieval target s is input to S[j].

Step (a-5): One log data is selected from the retrieval target selection log.

Step (a-6): The system determines whether a time t of this log data is within a time T from the time when the user has selected a keyword. The time T may be the time (e.g., 24 hr) determined by the system designer in advance or the time set by the user.

Step (a-7): If the time t is before the time T, the process returns to step (a-5).

Step (a-8): The system obtains a meaning number i by searching the meaning table M with the meaning m of the log. In this case, if M[i]=m, i can be regarded as a corresponding number.

Step (a-9): The system obtains a retrieval target number j by searching a retrieval table S with a retrieval target s of the log. In this case, if S[j]=s, j can be regarded as a corresponding number.

Step (a-10): The system adds one to the frequency value of C1[i] [j], and also adds one to the frequency value of CM1[i].

Step (a-11): The process returns to step (a-5).

Long-Term Selection Tendency Toward Single Retrieval Target

The system acquires a retrieval target selection frequency mi-C2-sj for each meaning from the time point when the user has used the information retrieval system for the first time, and sorts retrieval targets for each meaning in descending order of frequencies. Let mi (i=1, 2, . . . , NM) be a meaning type, sj (j=1, 2, . . . , NS) be a retrieval target type, mi-C2-sj be a long-term frequency toward the retrieval target sj corresponding to the meaning mi, NM be the total number of meanings, and NS be the total number of retrieval targets.

The following is a procedure of obtaining the long-term selection tendency toward a single retrieval target.

Procedure of Obtaining Long-Term Selection Tendency Toward Single Retrieval Target Step (b-1): A long-term retrieval target frequency table C2[NM][NS] and CM2[NM] are prepared.

Step (b-2): The system initializes the long-term retrieval target frequency table C2[NM] [NS] and CM2[NM].

Step (b-3): This step is the same as step (a-3) described above.

Step (b-4): This step is the same as step (a-3) described above.

Step (b-5): One log data is selected from the log table.

Step (b-6): The system obtains a meaning number i by searching a meaning table M with a meaning m of the log data. In this case, if M[i]=m, i can be regarded as a corresponding number.

Step (b-7): The system obtains a retrieval target number j by searching the retrieval target table S with a retrieval target s of the log data. In this case, if S[j]=s, j can be regarded as a corresponding number.

Step (b-8): The system adds one to the frequency value of C2[i] [j]. The system adds one to the frequency value of CM2[i].

Step (b-9): The process returns to step (b-5).

Cooccurrent Selection Tendency Toward Retrieval Targets

The information retrieval system holds a user selection frequency associated with a combination of time-serially cooccurrent retrieval targets like "retrieval target B has been selected immediately after selection of retrieval target A" and "retrieval target B has been selected immediately after selection of retrieval target A, and retrieval target C has been selected immediate after selection of retrieval target B" from the time point when the user has used the system for the first time. This operation is equivalent to generating an N-gram associated with a combination of time-serially cooccurrent retrieval targets from the time point when the user has used the information retrieval system for the first time.

Figure 6:
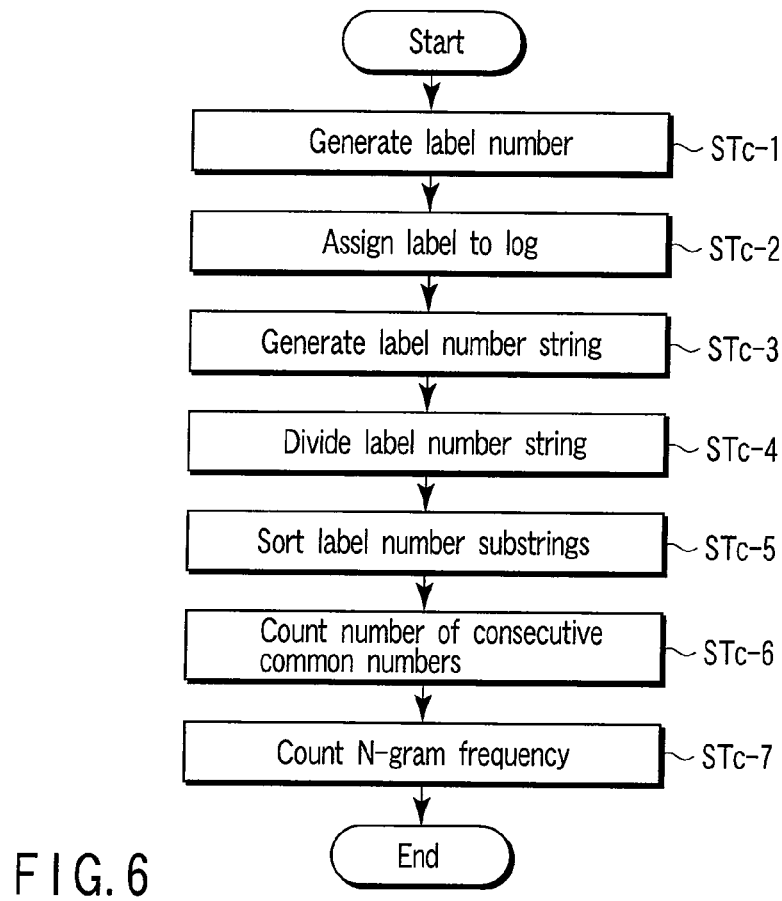
FIG. 6 is a flowchart showing a procedure of generating the N-gram of a retrieval target.

A procedure of generating the N-gram of the retrieval target selected by the user will be described below with reference to the flowchart of FIG. 6.

Procedure of Generating N-gram of Retrieval Target:

Step (c-1): The system assigns label numbers to combinations of the meanings of keywords and retrieval targets. In this case, the system assigns different label numbers to combinations including different meanings even if the combinations include the same retrieval target. For this purpose, a label number table L[NM] [NS] is prepared, and a label number is set to L. As label numbers, natural numbers are assigned in ascending order. Assume that a natural number is assigned to a combination of a meaning and a retrieval target like L[station name] [see surrounding map]=1.

Step (c-2): The system searches the label number table L with a combination of the meaning m and the retrieval target s of each log data (m, s, t) of the log table H, and assigns the corresponding label number to the log data. At this time, first of all, the system obtains the meaning number i by searching the table M with the meaning m of the log data, obtains the retrieval target number j by searching the table S with the retrieval target s of the log data, and obtains a label number for the log data from L[i] [j].

Step (c-3): The system applies step (c-2) to all the log data of the log table H, detects label numbers from H[0] to the latest log data, and generates a label number string a by sequentially arranging the label numbers. At this time, the length of the label number string $\alpha$ is represented by l$\alpha$.

Step (c-4): The system regards the label number string $\alpha$ with the length l$\alpha$ as one number string, and sequentially generating number strings by removing a number from the head of the number string one by one, thereby generating l$\alpha$ number strings (label number substrings).

Step (c-5): Since the l$\alpha$ number strings generated in step (c-4) comprise label numbers (i.e., natural numbers), the number strings are rearranged in ascending order of numbers.

Step (c-6): The system checks how many numbers of adjacent number strings, of the number strings rearranged in step (c-5), coincide with each other, counting from the head of each number string, and holds the number of coinciding numbers as additional information $\beta[q]$ (q=1, 2, . . . , l$\alpha$) for each number string.

Step (c-7): In the number strings rearranged in step (c-5), N numbers of the respective number strings from their heads are common to each other, the system sequentially counts from the head of each number string until the numerical value stored in $\beta$ becomes N or less. Since this count value can be regarded as the N-gram frequency of N numbers, every time new N numbers are detected, (numbers and N-gram frequency) are held as N-gram data GN[p] (p=1, 2, . . . )

(Operation of Retrieval Target Ranking Unit 7)

When the user determines the meaning of a keyword on the basis of the meaning of the keyword estimated by the meaning estimation unit 2, the control unit 8 sends the meaning of the keyword to the retrieval target search unit 4. The retrieval target search unit 4 searches the retrieval target knowledge base 3 for a retrieval target corresponding to the meaning by using the meaning of the keyword.

If there are a plurality of retrieval targets searched out in this manner as shown in FIG. 2, the retrieval target ranking unit 7 ranks the retrieval targets on the basis of the result obtained by the retrieval target selection tendency estimation unit 6. The following three cases are conceivable in ranking retrieval targets: a case wherein a short-term selection tendency toward a single retrieval target is to be taken into consideration; a case wherein a long-term selection tendency toward a single retrieval target is to be taken into consideration; and a case wherein a cooccurrent selection tendency toward retrieval targets is to be taken into consideration.

Ranking Procedure in Case Wherein Short-Term Selection Tendency toward Single Retrieval Target Is to Be Taken into Consideration:

Step (d-1): The retrieval target ranking unit 7 checks the number i of the keyword from the meaning table M described above on the basis of the meaning m of the keyword.

Step (d-2): The retrieval target ranking unit 7 checks the number j of the retrieval target from the retrieval target table S described above on the basis of the retrieval target type s searched out by the retrieval target search unit 4.

Step (d-3): The retrieval target ranking unit 7 obtains the frequency value of the retrieval target by detecting the value of C1[i] [j] from the short-term retrieval target frequency table C1.

Step (d-4): The retrieval target ranking unit 7 obtains the frequency value of each retrieval target by applying step (d-2) and step (d-3) to all the retrieval targets searched out by the retrieval target search unit 4.

Step (d-5): The retrieval target ranking unit 7 rearranges the retrieval targets searched out by the retrieval target search unit 4 in descending order of frequency values on the basis of the frequency values of the retrieval targets obtained in step (d-4).

Ranking Procedure in Case Wherein Long-Term Selection Tendency toward Single Retrieval Target Is to Be Taken into Consideration:

Step (e-1): The retrieval target ranking unit 7 checks the number i of the keyword from the meaning table M described above on the basis of the meaning m of the keyword.

Step (e-2): The retrieval target ranking unit 7 checks the number j of the retrieval target from the retrieval target table S described above on the basis of the retrieval target type s searched out by the retrieval target search unit 4.

Step (e-3): The retrieval target ranking unit 7 obtains the frequency value of the retrieval target by detecting the value of C2[i] [j] from the long-term retrieval target frequency table C2.

Step (e-4): The retrieval target ranking unit 7 obtains the frequency value of each retrieval target by applying step (e-2) and step (e-3) to all the retrieval targets searched out by the retrieval target search unit 4.

Step (e-5): The retrieval target ranking unit 7 ranks the retrieval targets searched out by the retrieval target search unit 4 by rearranging them in descending order of frequency values on the basis of the frequency values of the retrieval targets obtained in step (e-4).

Figure 7:
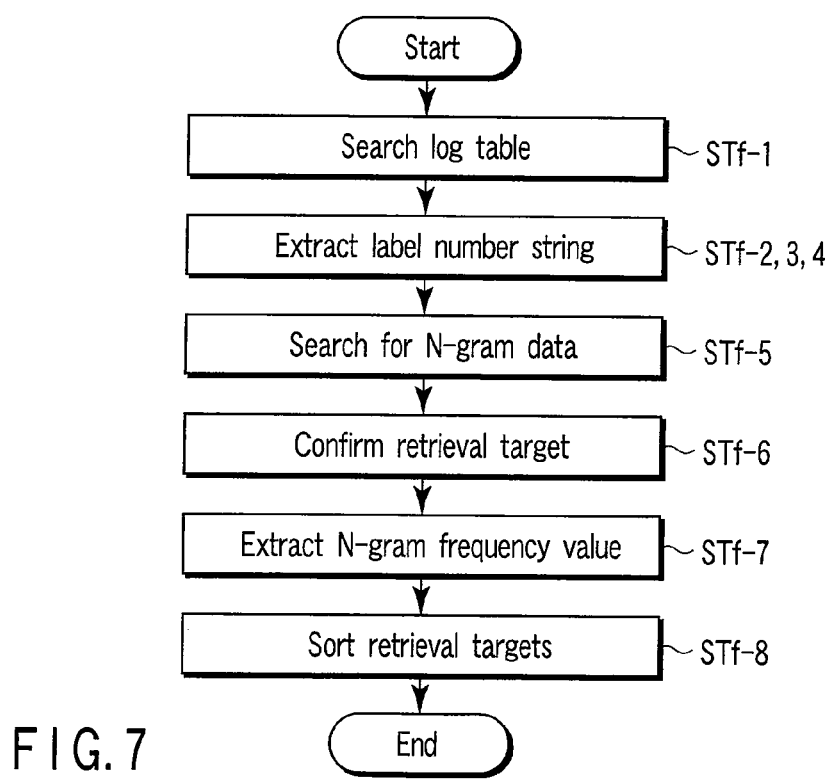
FIG. 7 is a flowchart showing a ranking procedure in a case wherein a cooccurrent selection tendency is taken into consideration.

A ranking procedure in a case wherein a cooccurrent selection tendency toward retrieval targets is to be taken into consideration will be described in accordance with the flowchart of FIG. 7.

Ranking Procedure in Case wherein Cooccurrent Selection Tendency toward Retrieval Targets Is to Be Taken into Consideration:

Step (f-1): When the user selects a keyword and confirms the appropriate meaning of the keyword from the keyword meaning menu presented by the system, the retrieval target ranking unit 7 obtains combinations of the meanings of keywords and retrieval targets throughout the N−1 preceding retrievals from the log table H.

Step (f-2): If the immediately preceding retrieval log data is stored in H[k−1], since a meaning mk−1 of the keyword and a retrieval target sk−1 can be obtained from H[k−1], the retrieval target ranking unit 7 obtains a meaning number and a retrieval target number from the meaning table M and the retrieval target table S, respectively, and obtains the label number of the retrieval from the label number table L.

Step (f-3): The retrieval target ranking unit 7 obtains the label numbers of the respective retrievals by applying step (e-2) to the respective N−1 preceding retrievals obtained in step (f-1).

Step (f-4): The retrieval target ranking unit 7 generates N−1 label number strings by arranging label numbers corresponding to the N−1th retrieval to the immediately preceding retrieval.

Step (f-5): The retrieval target ranking unit 7 detects all N-gram data, of N-gram data GN, in which the first to N−1th number strings coincide with each other.

Step (f-6): The retrieval target ranking unit 7 extracts the last label number of a label number string from each of the N-gram data obtained in step (f-5). The unit 7 then specifies the meaning of the keyword and the retrieval target which constitute the last level number by searching the label number table on the basis of the label number.

Step (f-7): The retrieval target ranking unit 7 extracts, from the label numbers extracted in step (f-6), a label number at which the meaning selected by the user coincides with the meaning constituting the label number, and obtains retrieval targets and N-gram frequency values.

Step (f-8): The retrieval target ranking unit 7 ranks the retrieval targets obtain in step (f-7) by rearranging them in descending order of N-gram frequency values.

Ranking retrieval targets in this manner makes it possible to perform the following information retrieval in, for example, the case shown in FIG. 3. Assume that the system is calculating a 3-gram (tri-gram) by using the retrieval target selection tendency estimation unit 6.

(1) The user selects "company T" in a committee invitation notification with the pointing device 10, and selects the retrieval target "search for map" from the menu presented by the system to search for a map page of the company T.

(2) The user sees the map page of the company T and finds that the station nearest to the company T is the Hamamatsu-cho station. The user then selects "Hamamatsu-cho" in the page with the pointing device, and selects "access guide" from the menu presented by the system to search for a guide page.

(3) Assume that the user selects "Hamamatsu-cho" in the guide page. In this case, when the retrieval targets "search for map" and "access guide" are sequentially selected, the system knows, from the selection log data of meanings and retrieval targets and retrieval tendencies, that the retrieval target "search for surrounding map of station" has been selected most often. The system therefore ranks "search for surrounding map of station" highest in the retrieval target menu, and presents the menu to the user.

The user can therefore easily access target information by selecting "search for surrounding map of station" ranked highest in the presented retrieval target menu.

Assume also that the user has known that a new product from the company T has been introduced in a WWW news site. In this case, the user can perform the following information retrieval.

(1) The user selects the name of the new product on a page of the site with the pointing device 10, and selects "search for catalog page from maker" from the menu presented by the system to search for a catalog page of the site of the company T.

(2) The user reads the catalog page and becomes interested in the product. The user therefore wants to know more detailed information about the product, and hence selects the name of the product on the page again with the pointing device 10. At the same time, the user selects "check popularity information" from the retrieval target menu presented by the system to search for a word-of-mouth site.

(3) Assume that the user wants to purchase the product upon checking the popularity of the product, and has selected the name of the product in the word-of-mouth site with the pointing device 10. In this case, when the retrieval targets "search for catalog page from maker" and "check popularity information" are sequentially selected, the system knows, from the selection log data of meanings and retrieval targets and retrieval tendencies, that the retrieval target "access shopping site" has been selected most often. The system therefore ranks "access shopping site" highest in the retrieval target menu, and presents the menu to the user.

(4) The user can easily access target information by selecting "access shopping site" ranked highest in the presented retrieval target menu.

In this embodiment, it suffices to execute ranking in consideration of the short-term selection tendency toward a single retrieval target on the basis of the following procedure. Procedure 2 of Performing Ranking in Consideration of Short-Term Selection Tendency toward Single Retrieval Target:

[Step (g-1)]: When the user activates a terminal which executes information retrieval, the retrieval target ranking unit 7 reads the long-term retrieval target frequency table C2.

[Step (g-2)]: The retrieval target ranking unit 7 ranks retrieval targets for each meaning of keywords by using the long-term retrieval target frequency table C2, and holds the ranking result until the terminal is turned off. Assume that a retrieval target ranking table RS_mi is to be generated for each meaning of keywords.

[Step (g-3)]: When the user selects a keyword and the meaning mi of the keyword, the retrieval target ranking unit 7 ranks retrieval targets on the basis of the retrieval target ranking table RS_mi of the meaning mi.

[Step (g-4)]: When the user newly executes information retrieval, the retrieval target ranking unit 7 ranks the retrieval target selected by the user highest in the retrieval target ranking table RS_mi of the meaning.

[Step (g-5)]: The retrieval target ranking unit 7 executes step (g-4) every time retrieval is performed, and keeps updating the retrieval target ranking table.

Figure 4:
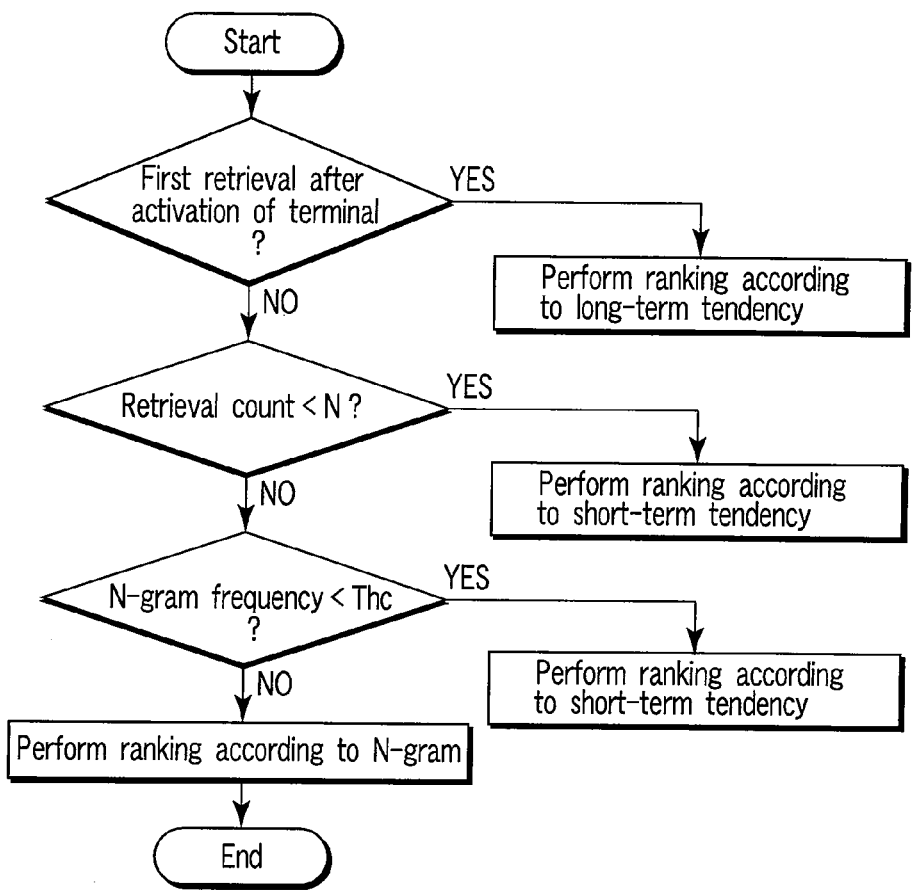
FIG. 4 is a flowchart showing a ranking procedure.

In this embodiment, the retrieval target ranking unit 7 may rank retrieval targets on the basis of the algorithm shown in FIG. 4.

That is, in the first retrieval operation executed when the user activates the terminal, the retrieval target ranking unit 7 ranks retrieval targets in consideration of a long-term selection tendency.

In the second to Nth retrieval operations after the activation of the terminal, the retrieval target ranking unit 7 ranks retrieval targets in consideration of a short-term selection tendency.

Assume that in the Nth and subsequent retrieval operations after the activation of the terminal, an N-gram containing the retrieval does not exist in the N-gram data GN, or even if such an N-gram exists in the N-gram data Gn, the meaning at the last number label of the N-gram differs from the meaning selected by the user. Alternatively, assume that an N-gram containing the retrieval exists in the N-gram data GN, and the meaning at the last number label of the N-gram coincides with the meaning selected by the user. Even in this case, if the N-gram frequency value is less than a predetermined threshold Thc, the retrieval target ranking unit 7 ranks retrieval targets in consideration of a short-term selection tendency.

Assume that in cases other than the above cases, the retrieval target ranking unit 7 ranks retrieval targets in consideration of an N-gram frequency.

In the above cases, in order to search for information associated with the keyword which the user has selected with the pointing device 10, it is necessary to select an appropriate meaning from the menu of the meanings of the keyword presented by the system and select an appropriate retrieval target from the retrieval target menu associated with the keyword. In this case, since the user must select appropriate information from the two menus, it is difficult to say that the complexity of operation at the time of retrieval is greatly reduced. The following is an example of how the number of times of operation by the user can be reduced by presenting only a retrieval target menu without presenting any meaning menu to the user.

Assume that in this case, the user has executed information retrieval in the above manner to some degree after the user started using the information retrieval system, and the system has stored a sufficient amount of user operation log data. Assume also that the system has obtained the short-term meaning frequency value CM1[NM] and the long-term meaning frequency value CM2[NM].

Assume that the user has desired not to select a meaning menu. In this system, this operation can be performed by allowing the user to select "do not display meaning menu". Assume that thereafter, when estimating the meaning selected by the user, the meaning estimation unit 2 weights an estimation result in accordance with a frequency value. That is, the meaning estimation unit 2 gives consideration to the value obtained by dividing the frequency value of each meaning by the total sum of frequency values as a confidence factor. Consider the following three cases in ranking retrieval target: a case wherein a short-term selection tendency toward a single retrieval target is to be taken into consideration; a case wherein a long-term selection tendency toward a single retrieval target is to be taken into consideration; and a case wherein a cooccurrent selection tendency toward retrieval targets is to be taken into consideration.

Ranking in Case wherein Short-Term Selection Tendency toward Single Retrieval Target Is to Be Taken into Consideration:

The system ranks retrieval targets for each meaning by applying step (d-1) to step (d-5) to the respective meanings with the confidence factors output from the meaning estimation unit 2. At this time, in step (d-4), the system updates the frequency values of the respective retrieval targets by multiplying them by the confidence factors of meanings. Assume that the system executes this operation for all the meanings output from the meaning estimation unit 2, ranks all the obtained retrieval targets on the basis of the frequency values normalized with the confidence factors, and presents the resultant menu to the user. Assume that when the user has selected an appropriate retrieval target from the retrieval targets ranked in this manner, the system regards one of the meanings of the keyword including the retrieval target which has the highest short-term meaning frequency value CM1[NM] as the meaning of the keyword in the retrieval. Making the system confirm the meaning of a keyword in this manner makes it possible to obtain a short-term selection tendency toward a single retrieval target by the procedure from step (a-1) to step (a-11).

Ranking in Case wherein Long-Term Selection Tendency toward Single Retrieval Target Is to Be Taken into Consideration:

The system ranks retrieval targets by applying step (e-1) to step (e-5) to the respective meanings with the confidence factors output from the meaning estimation unit 2. At this time, in step (e-4), the system updates the frequency values of the respective retrieval targets by multiplying them by the confidence factors of meanings. Assume that the system executes this operation for all the meanings output from the meaning estimation unit 2, ranks all the obtained retrieval targets on the basis of the frequency values normalized with the confidence factors, and presents the resultant menu to the user. Assume that when the user has selected an appropriate retrieval target from the retrieval targets ranked in this manner, the system regards one of the meanings of the keyword including the retrieval target which has the highest long-term meaning frequency value CM2[NM] as the meaning of the keyword in the retrieval. Making the system confirm the meaning of a keyword in this manner makes it possible to obtain a long-term selection tendency toward a single retrieval target by the procedure from step (c-1) to step (c-7).

Ranking in Case wherein Cooccurrent Selection Tendency toward Retrieval Targets Is to Be Taken into Consideration.

When the user executes information retrieval, the system executes step (f-1) to step (f-8) described above to rank retrieval targets and express the result as a menu. Assume that at this time, in step (f-7), the system obtains the frequency values of retrieval targets and N-grams with respect to all the label numbers extracted in step (f-6). When the user selects an appropriate retrieval target from the retrieval targets ranked in this manner, the system regards one of the meanings of the keyword including the retrieval target which has the highest long-term meaning frequency value CM2[NM] as the meaning of the keyword in the retrieval. Making the system confirm the meaning of a keyword in this manner makes it possible to obtain a cooccurrent selection tendency toward retrieval targets by the procedure from step (b-1) to step (b-9).

When a plurality of user terminals incorporate information retrieval apparatuses according to this embodiment, the respective user terminals can obtain retrieval target selection logs and selection tendencies. In this case, it is preferable that the respective user terminals are connected to a server through a network, and the same server performs centralized control on the data of the retrieval target selection logs and selection tendencies of the respective users so as to allow the respective users to share the data. This allow a given user to use a short-term selection tendency toward a single retrieval target, a long-term selection tendency toward a signal retrieval target, and a cooccurrent selection tendency toward retrieval targets which are calculated from the retrieval target selection log of an arbitrary another user. In addition, the system can derive a short-term selection tendency toward a single retrieval target, a long-term selection tendency toward a signal retrieval target, and a cooccurrent selection tendency toward retrieval targets from the data obtained by combining the retrieval target selection logs of all the users, and allows each user to use them in information retrieval. This can further improve the operability and convenience at the time of information retrieval.

As has been described above, according to this embodiment, when the user designates a keyword in a displayed document with the pointing device 10, the system estimates the meanings of the keyword, and expresses meaning candidates as a menu. The system then presents the menu to the user through the display 9. When the user selects an appropriate keyword for information retrieval on the menu, the system searches the knowledge base 3 constructed in advance for retrieval targets corresponding to the meaning of the keyword, and presents the result as a menu to the user. In this case, the retrieval targets are ranked and expressed as a menu in accordance with the selection frequencies of the retrieval targets based on the user access log of the system. The user can select a retrieval target ranked high in the menu in which the retrieval targets are ranked, and perform desired information retrieval associated with the keyword. This can prevent the operation of searching for a desired item from taking a long time and becoming complex as in a case wherein retrieval targets which the user frequently selects are displayed at unspecified low-order positions in a menu, thereby improving the operability.

Note that the present invention is not limited to the above embodiments, and constituent elements can be variously modified and embodied at the execution stage within the spirit and scope of the invention. Various inventions can be formed by proper combinations of a plurality of constituent elements disclosed in the above embodiments. For example, several constituent elements may be omitted from the all the constituent elements in each embodiment. In addition, constituent elements of the different embodiments may be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information retrieval apparatus comprising:
    a first database which stores a plurality of keywords and a plurality of meaning items associated with each of said plurality of keywords;
    a second database which stores said plurality of meaning items and a plurality of retrieval target items respectively corresponding to said plurality of meaning items;
    a control unit which accepts a keyword designated by a user;
    a first estimation unit which estimates a plurality of meaning items of the designated keyword by searching the first database with the designated keyword;
    a search unit which searches the second database for a plurality of retrieval target items respectively corresponding to said plurality of estimated meaning items;
    a display unit which displays a first display menu showing said plurality of estimated meaning items and a second display menu showing at least one of the searched retrieval target items, the at least one of the searched retrieval target items corresponding to a meaning item selected on the first display menu;
    a log storage unit which stores a selection log including meaning items selected on the first display menu and retrieval target items selected on the second display menu;
    a second estimation unit which estimates, from the selection log, a selection tendency toward a retrieval target item on the second display menu which corresponds to the meaning item selected on the first display menu, wherein the selection tendency includes one of short-term selection tendency, long-term selection tendency, and co-occurrence selection tendency; and
    a ranking unit which performs ranking of said plurality of retrieval target items with respect to each of said plurality of meaning items on the basis of the selection tendency, wherein said ranking unit performs said ranking based on said long-term tendency in the event of a first retrieval operation executed when the user activates the apparatus and performs said ranking based on said short-term tendency in a second retrieval operation to an $n^{th}$ retrieval operation after the activation of the apparatus, wherein the display unit displays the at least one of the retrieval target items on the second display menu in accordance with the ranking.

2. The apparatus according to claim 1, wherein the second database further stores a plurality of additional keywords associated with said plurality of retrieval target items, and further comprising an information retrieval unit which, upon one of the retrieval target items being selected on the second display menu, generates a retrieval request including the designated keyword and corresponding one of the additional keywords, and performs information retrieval using the retrieval request.

3. The apparatus according to claim 1, wherein the ranking unit performs ranking such that a more frequently selected retrieval target item is ranked higher.

4. The apparatus according to claim 1, wherein the second estimation unit estimates the selection tendency by calculating, from the selection log, a frequency of a combination of a meaning item selected on the first display menu and a retrieval target item selected on the second display menu.

5. The apparatus according to claim 1, wherein the second estimation unit estimates the selection tendency by calculating, from the selection log, an N-gram statistical value of a combination of a meaning item selected on the first display menu and a retrieval target item selected on the second display menu.

6. The apparatus according to claim 1, wherein the ranking unit performs the ranking in accordance with the co-occurrence tendency, in the event that an N-gram frequency is greater than a second threshold.

7. The apparatus according to claim 1, further comprising an N-gram frequency calculation unit configured to assign a label number to each combination of a meaning item and a retrieval target item in the selection log, generate a label number string by sequentially arranging the label numbers, generate a plurality of label number substrings from the label number string, rearrange the plurality of label number substrings in ascending order, check how many adjacent label number substrings coincide with each other, and count an N-gram frequency based on the coinciding label number substrings.

8. The apparatus according to claim 1, wherein the ranking unit performs the ranking in accordance with the co-occurrence tendency, in the event that an N-gram frequency is greater than a second threshold, and the ranking unit is further configured to obtain a meaning number and a retrieval target number, obtain label numbers of the respective retrievals, generate label number strings by arranging the label numbers, obtain N-gram data for the label number strings that coincide with each other, extract a last label number from each coincident label number string, specify the meaning of the keyword and the retrieval target which constitute the last level number on the basis of the label number, extract from each of the coincident label number strings, a label number at which the meaning selected by the user coincides with the meaning constituting the label number, obtain retrieval targets and N-gram frequency values, and rank the retrieval targets in descending order based on the N-gram frequencies.

9. An information retrieval method comprising:
    storing in a first database a plurality of keywords and a plurality of meaning items associated with each of said plurality of keywords;
    storing in a second database said plurality of meaning items and a plurality of retrieval target items respectively corresponding to said plurality of meaning items;

accepting a keyword designated by a user;
estimating a plurality of meaning items of the designated keyword by searching the first database with the designated keyword;
searching the second database for a plurality of retrieval target items respectively corresponding to said plurality of estimated meaning items;
displaying a first display menu showing said plurality of estimated meaning items and a second display menu showing at least one of the searched retrieval target items, the at least one of the searched retrieval target items corresponding to a meaning item selected on the first display menu;
storing a selection log including meaning items selected on the first display menu and retrieval target items selected on the second display menu;
estimating, from the selection log, a selection tendency toward a retrieval target item on the second display menu which corresponds to the meaning item selected on the first display menu, wherein the selection tendency includes one of short-term selection tendency, long-term selection tendency, and co-occurrence selection tendency; and
performing ranking of said plurality of retrieval target items with respect to each of said plurality of meaning items on the basis of the selection tendency, wherein said ranking is based on said long-term selection tendency in the event of a first retrieval operation executed when the user activates the terminal and is based on said short-term selection tendency in a second retrieval operation to an Nth retrieval operation after the activation of the terminal,
wherein the at least one of the retrieval target items are displayed on the second display menu in accordance with the ranking.

10. The method according to claim 9, wherein the second database further stores a plurality of additional keywords associated with said plurality of retrieval target items, and further comprising, upon one of the retrieval target items being selected on the second display menu, generating a retrieval request including the designated keyword and corresponding one of the additional keywords, and performing information retrieval using the retrieval target.

11. The method according to claim 9, further comprising performing ranking such that a more frequently selected retrieval target item is ranked higher.

12. The method according to claim 9, further comprising estimating the selection tendency by calculating, from the selection log, a frequency of a combination of a meaning item selected on the first display menu and a retrieval target item selected on the second display menu.

13. The method according to claim 9, further comprising estimating the selection tendency by calculating, from the selection log, an N-gram statistical value of a combination of a meaning item selected on the first display menu and a retrieval target item selected on the second display menu.

14. A computer readable storage medium storing instructions of a computer program which when executed by a computer results in performance of steps comprising:
storing, in a first database, a plurality of keywords and a plurality of meaning items associated with each of said plurality of keywords;
storing, in a second database, said plurality of meaning items and a plurality of retrieval target items respectively corresponding to said plurality of meaning items;
accepting a keyword designated by a user;
estimating a plurality of meaning items of the designated keyword by searching the first database with the designated keyword;
searching the second database for a plurality of retrieval target items respectively corresponding to said plurality of estimated meaning items;
displaying a first display menu showing said plurality of estimated meaning items and a second display menu showing at least one of the searched retrieval target items, the at least one of the searched retrieval target items corresponding to a meaning item selected on the first display menu;
storing a selection log including meaning items selected on the first display menu and retrieval target items selected on the second display menu;
estimating, from the selection log, a selection tendency toward a retrieval target item on the second display menu which corresponds to the meaning item selected on the first display menu, wherein the selection tendency includes one of short-term selection tendency, long-term selection tendency, and co-occurrence selection tendency; and
performing ranking of said plurality of retrieval target items with respect to each of said plurality of meaning items on the basis of the selection tendency, wherein said ranking is based on said long-term selection tendency in the event of a first retrieval operation executed when the user activates the terminal and is based on said short-term selection tendency in a second retrieval operation to an Nth retrieval operation after the activation of the terminal,
wherein the at least one of the retrieval target items are displayed on the second display menu in accordance with the ranking.

15. The medium according to claim 14, wherein the second database further stores a plurality of additional keywords associated with said plurality of retrieval target items, and further comprising, upon one of the retrieval target items being selected on the second display menu, generating a retrieval request including the designated keyword and corresponding one of the additional keywords, and performing information retrieval using the retrieval request.

16. The medium according to claim 14, wherein ranking is performed such that a more frequently selected retrieval target item is ranked higher.

17. The medium according to claim 14, wherein the selection tendency is estimated by calculating, from the selection log, a frequency of a combination of a meaning item selected on the first display menu and a retrieval target item selected on the second display menu.

18. The medium according to claim 14, wherein the selection tendency is estimated by calculating, from the selection log, an N-gram statistical value of a combination of a meaning item selected on the first display menu and a retrieval target item selected on the second display menu.

* * * * *